E. P. LYNCH.
MACHINE FOR SEPARATING SOLUTIONS FROM CRUSHED ORES.
APPLICATION FILED JUNE 28, 1909.
985,611.
Patented Feb. 28, 1911.
2 SHEETS—SHEET 2.
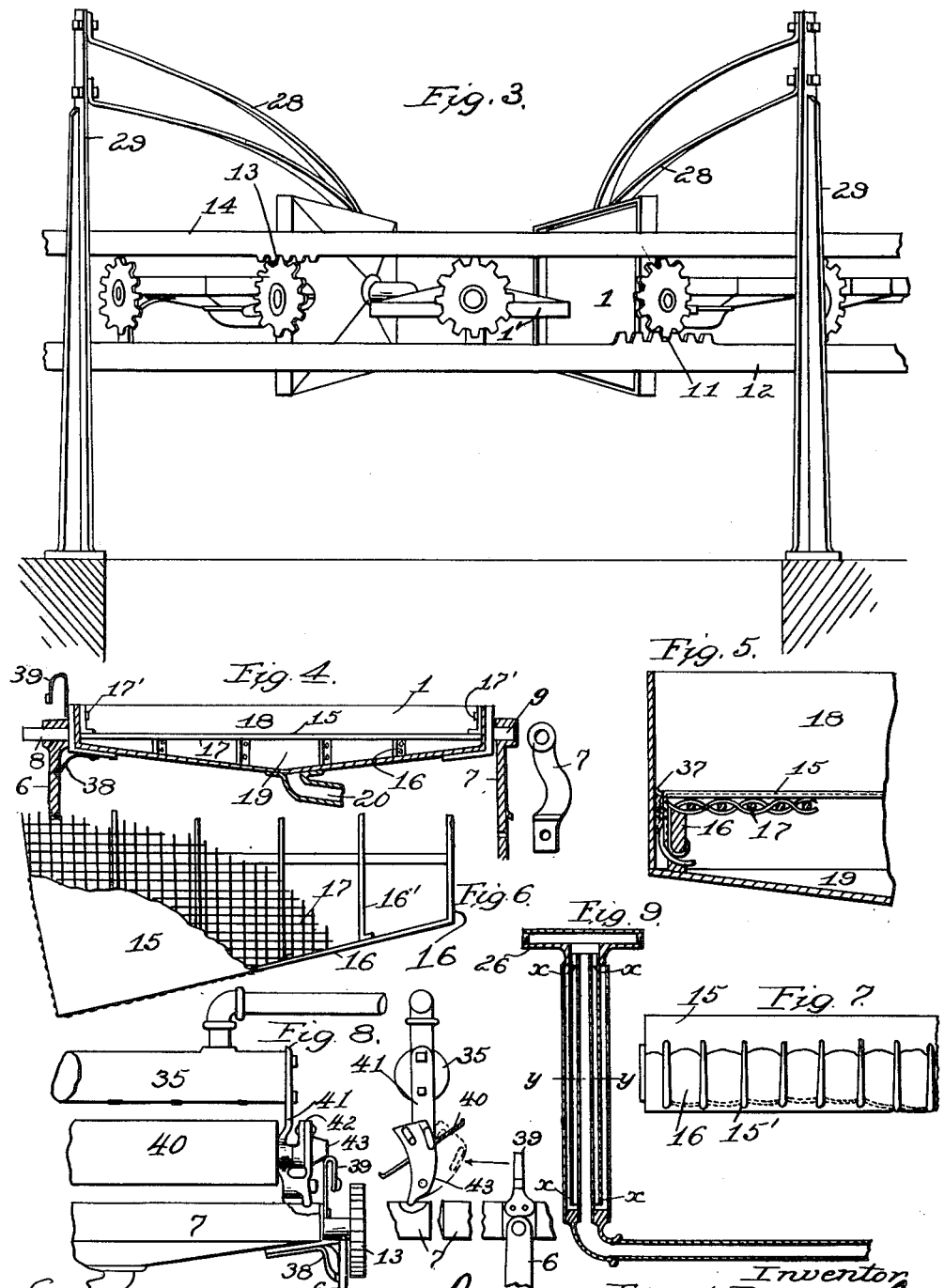

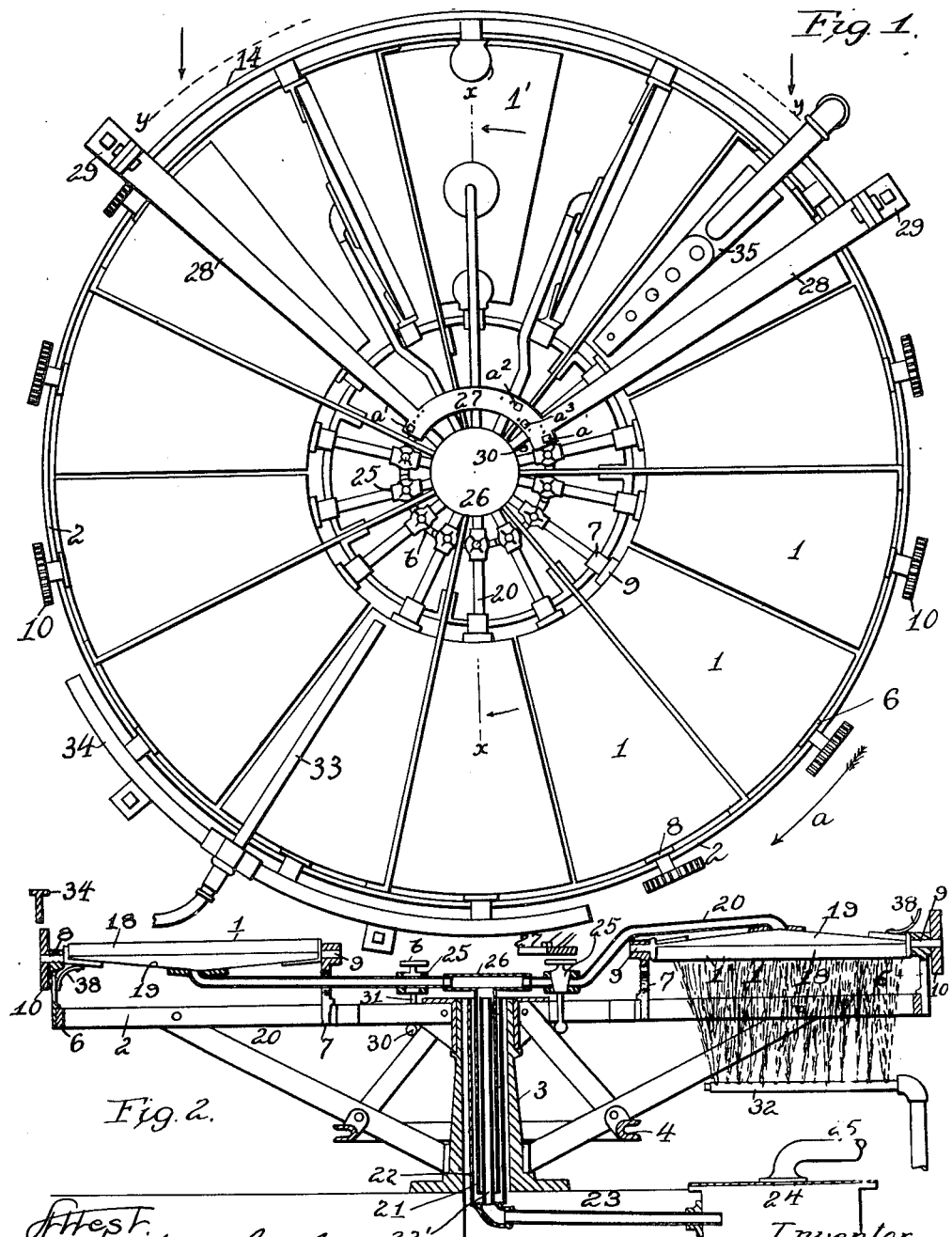

UNITED STATES PATENT OFFICE.

EDWARD P. LYNCH, OF LOS ANGELES, CALIFORNIA.

MACHINE FOR SEPARATING SOLUTIONS FROM CRUSHED ORES.

985,611.   Specification of Letters Patent.   Patented Feb. 28, 1911.

Application filed June 28, 1909. Serial No. 504,863.

*To all whom it may concern:*

Be it known that I, EDWARD P. LYNCH, a citizen of the United States, and a resident of Los Angeles, in the county of Los Angeles and State of California, have invented certain new and useful Improvements in Machines for Separating Solutions from Crushed Ores, the invention relating to machinery employed in the separation of fluids or fluid solutions from substances which they may be holding in suspension or with which they are intimately mingled—for instance, the separation of cyanid solution from finely-crushed or slimy ore after the values have been taken up by it.

I attain this object by mechanisms illustrated in the accompanying drawings in which,—

Figure 1 is a top view of the machine. Fig. 2 is a vertical section through the line $x$—$x$ Fig. 1. Fig. 3 is a vertical projection from $y$— to $y$ Fig. 1. Fig. 4 is a vertical section through the tray. Fig. 5 is detail of a section of the members of the filtering device and method of forming an air-tight connection between the tray and filter. Fig. 6 shows a section of the parts forming the filtering device. Fig. 7 the method of securing the filter cloth to its supporting frame. Fig. 8, feed deflecting shield and its operating parts. Fig. 9, detail of frictionless and air tight revolving pipe joint.

Similar letters and numbers refer to similar parts throughout the several views.

The mechanism is adapted to the following sequence of operation while making a circuit. First: feeding into trays horizontally and reversibly mounted on a frame moving horizontally and continuously around a center, determined portions of pulp. Second: by means of filtering devices in each tray and the action of a suitably connected vacuum pump, producing suction effects beneath the filter to expedite the separation of the fluid portion of the pulp. Third: by means of appliances, to flow over the residue on the filter, weak solutions or washwater or both, to force from it the solution that it may contain as moisture. Fourth: to cut out the suction effects, reverse the tray, forcing under the filter air, steam or water, to clean the residue from it, supplementing the above and substituting therefor as may be necessary, suitably arranged upward impinging jets of water to clean or aid in cleaning the downturned filter surface. Fifth: then returning the tray to its normal position in readiness for another charge by a movement the reverse of that which placed it top downward.

As the crushed ores or material from which solution must be separated may be silicious or clayey giving up liquids with ease or great difficulty the daily capacity of my mechanism will depend on the nature of the material that is to be treated, it fixing the rate of travel of the trays and the quantity placed in them.

The apparatus Figs. 1 and 2 by which I accomplish this work consists of a series of horizontally placed trays 1 mounted on a frame 2 which is supported by and turns horizontally around a pedestal 3, the travel of the frame and trays being effected by applying power to the sheave 4, or by any of the means in common use. The trays 1 are connected to frame 2 by supports 6 and 7 which have at their upper ends bearings in which the gudgeons 8 and 9 secured to the tray 1, can turn, so as to make tray 1 reversible. A toothed wheel 10 on the end of gudgeon 8 of each tray engages at one point in the travel of the tray when making its circuit, with the toothed projections 11 on the piece 12 Fig. 3, which turns the tray upside down as shown at 1' Figs. 1 and 2. A further travel of the tray causes 10 to engage the projections 13 on piece 14 with the effect of turning the tray back to its original position; the parts 12 and 14 are firmly secured to the fixed posts 29—29.

The trays 1 are divided into two compartments by a filtering device Figs. 4 and 5, made up of a filtering material 15, which is supported by the frame 16, and screen 17, and held in its place in the tray by the stops 17'. The upper compartment 18 is for the charge of pulp, the lower 19, which must be air tight when the filter is covered with pulp, is through the valve 25 connected by means of hose 20 and pipes 21, 22 and 23 through head 26 to a vacuum pump, not shown, or to the tank 24 from which the air can be exhausted by a pump. The object being to exhaust at proper time the air from the compartment 19 producing a suction effect in order to expedite the separation of the liquids or solution from the pulp placed in 18.

The ports of the valve 25 are arranged and so controlled by means of arms on the cross-head $b$ coming in contact with the pins $a$, $a^1$, $a^2$, $a^3$, adjustably secured to 27, which, held in place by arms 28—28, secured to the post 29—29 is held rigidly over the tray 1 and frame 2 traveling beneath; so that when each tray in the course of its travel, has its filter covered with pulp, the pin $a$ coming in contact with an arm of the cross-bars $b$, opens up the connection between the compartment 19 and the vacuum pump. When separation of the fluid is complete and filter is ready to be cleaned, the pin $a^1$ closes connection to pump and opens connection to a supply of air, steam or water which through the pipes 30 and 31 and properly arranged ports in 25, have access to 19 in order to exert a pressure through the filter to clean from it the waste. When tray 1 is being reversed, jets of water through pipe 32 may be used to assist in cleaning the filter. When tray 1 is turned to its normal position pin $a^2$ turns the valve stem and opens a waste port to let any water that may be in 19 escape, pin $a^3$ will close the waste, leaving the tray ready to receive another charge.

Pipe 33 which can be in duplicate, is adjustably secured to and supported by a permanent fixture 34, forms the means through which wash water or weak solution and wash water can be flowed over the residue in the tray, to wash from it the value that may remain with the solution that is held up as moisture. The supply of wash water can be adjusted by a valve or a valve stem operated by the traveling frame 2.

Fig. 8 represents a section of the feeding apparatus made up of a distributing pipe 35, deflecting shield 40, which is supported in bearings 41. To 40 is secured a crank arm 42, which is actuated through the lever 43 by the moving parts beneath it; contact with the tray turns the shield up and over deflecting the feed into the coming tray, contact with another moving part returns the shield to its original position in readiness for the next oncoming tray.

Fig. 4 shows a vertical section of tray 1 with pivotal gudgeons 8 and 9, the tray 1 has compartments 18 and 19 formed by the filtering device which is made up of parts as follows: Outside frame 16 and cross-support 16' which carries the wire screen over which a filtering material 15 is placed, and is secured to the outside frame 16 by means of a strong cord or wire 15 by which it is sewed to the frame substantially shown in Figs. 5 and 7. The filtering frame is made slightly smaller than the tray so that a narrow space shown in Fig. 5, is between the frame 16 and the side of tray in which a sealing substance 37 is placed to make an air tight connection between the two.

Fastened to 8 is a spring 38 which engages with the support 6 in a depression on its inside face in order to hold the tray in a horizontal position when it is upright; and spring 39 secured to 8 engaging in the same depression holds the tray level when reversed. The hose connection 20 is of such length that it will permit the tray to be reversed.

In view of the need of having air tight connections between the trays and vacuum pump, I form the upper section of the stationary pipe 23 Fig. 2 which leads to the vacuum tank 24 or to a vacuum pump not shown of two parts, an outer pipe 22 and an inner one 22', making a deep cup into which is placed the pipe 21 which is integral with the head 26. The cup so formed is of such depth and is filled with quicksilver sufficient to make an air tight joint when under vacuum effects, $x\ x$ representing mercury limits when it is under vacuum stress and $y\ y$ when not. See Fig. 9.

I claim—

1. A separating machine comprising a series of radial filtering trays, means for rotating the trays, suction means, a flexible pipe connecting each tray to the said means and means at one point of the travel of the tray for reversing it and at another point for turning it backward to normal position.

2. In a machine of the class described, a series of radially and pivotally mounted trays arranged to travel around a common center, each tray having an upper and lower compartment, radial flexible pipes connecting the trays through a valve to a common pipe center in which suction effects can be maintained, means to open at one portion of each tray's travel connections so as to permit suction effects in one of the compartments, and at another point in the tray's travel to close the tray compartment to the suction effect.

3. In a machine of the class described, a series of trays mounted to travel around a common center, each tray having a chamber in which suction effects can be produced through connections to a common pipe traveling with the trays, and means to form an air tight joint between this traveling pipe and a stationary continuation thereof consisting of a deep cup like pipe section which forms the upper extension of the stationary pipe; the cup so formed containing quicksilver into which the moving pipe is partially immersed.

4. In a machine of the class described, a series of trays radially and pivotally mounted and arranged to travel around a common center, having filtering devices, which form in each tray two compartments, in one of which suction effects can be produced, means for providing each tray with layer of pulp, means for removing the liquid portions thereof by suction, means for washing the residue at another point of the tray's travel, means to upset the tray at another point, means for applying cleaning material through the suction connection to the tray and means for turning back each tray before or as it completes its circuit to its normal position.

In testimony whereof I have affixed my signature in presence of two witnesses, this 22d day of May, 1909.

EDWARD P. LYNCH.

Witnesses:
J. C. FARKNER,
KATHERINE FOREMAN.